US011749976B2

(12) United States Patent
Thingstad Pettersen et al.

(10) Patent No.: US 11,749,976 B2
(45) Date of Patent: Sep. 5, 2023

(54) SWITCH-FUSE MODULE

(71) Applicant: ABB Schweiz AG, Baden (CH)

(72) Inventors: Terje Thingstad Pettersen, Skien (NO); John Rune West, Skien (NO); Ståle Talmo, Skien (NO); Stanley Lohne, Porsgrunn (NO); Elham Attar, Skien (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/653,592

(22) Filed: Mar. 4, 2022

(65) Prior Publication Data

US 2022/0294195 A1 Sep. 15, 2022

(30) Foreign Application Priority Data

Mar. 11, 2021 (EP) .................................. 21162041

(51) Int. Cl.
*H01H 33/56* (2006.01)
*H01H 85/00* (2006.01)
*H02B 5/06* (2006.01)
*H02B 13/035* (2006.01)

(52) U.S. Cl.
CPC .......... *H02B 13/035* (2013.01); *H01H 33/56* (2013.01); *H01H 85/0026* (2013.01); *H02B 5/06* (2013.01)

(58) Field of Classification Search
CPC ...... H01H 33/56; H01H 33/022; H01H 33/22; H01H 31/12; H01H 31/003; H01H 1/18; H01H 85/0026; H01H 85/2045; H01H 85/0241; H02B 13/035; H02B 5/06

USPC ........ 218/43, 45, 47, 55, 67, 68, 70, 79, 80, 218/97, 100, 114, 115
See application file for complete search history.

(56) References Cited

U.S. PATENT DOCUMENTS

| | | | |
|---|---|---|---|
| 4,384,185 A | 5/1983 | Hall et al. | |
| 6,865,072 B2 * | 3/2005 | Sato | H01H 33/6661 361/612 |
| 8,426,758 B2 * | 4/2013 | Bonfanti | H01H 31/28 218/100 |

(Continued)

FOREIGN PATENT DOCUMENTS

| | | |
|---|---|---|
| DE | 102015106867 A1 | 11/2016 |
| EP | 0517295 A2 | 12/1992 |

(Continued)

OTHER PUBLICATIONS

Translation of DE102015106867 (Original document published Nov. 10, 2016) (Year: 2016).*

(Continued)

*Primary Examiner* — William A Bolton
(74) *Attorney, Agent, or Firm* — WHITMYER IP GROUP LLC

(57) ABSTRACT

A switch-fuse module and a ring main unit. The switch-fuse module includes: a housing having therein a switch enclosure including an insulating gas and a cable compartment that is different and separate from the switch enclosure; at least one switch disconnector arranged within the switch enclosure; and at least one fuse canister with a vertically oriented longitudinal axis; wherein the fuse canister i) is adapted to receive a fuse, and ii) is arranged within the cable compartment, and the insulating gas has a global warming potential less than a global warming potential of SF6.

22 Claims, 2 Drawing Sheets

(56) References Cited

U.S. PATENT DOCUMENTS

| | | | | |
|---|---|---|---|---|
| 8,680,421 | B2* | 3/2014 | Hyrenbach | H01H 9/02 |
| | | | | 218/118 |
| 10,176,959 | B1* | 1/2019 | Bhalla | H02B 1/04 |
| 2002/0063111 | A1* | 5/2002 | Nishitani | H02B 13/045 |
| | | | | 218/118 |
| 2016/0300683 | A1* | 10/2016 | Garcia | H01H 1/32 |
| 2020/0203934 | A1* | 6/2020 | Kozel | H02B 1/38 |

FOREIGN PATENT DOCUMENTS

| | | |
|---|---|---|
| EP | 3780055 A1 | 2/2021 |
| FR | 2846802 A1 | 5/2004 |
| GB | 2338616 A | 12/1999 |

OTHER PUBLICATIONS

Extended European Search Report; Application No. 21162041.4; Completed: Oct. 7, 2021; dated Oct. 18, 2021; 9 Pages.

\* cited by examiner

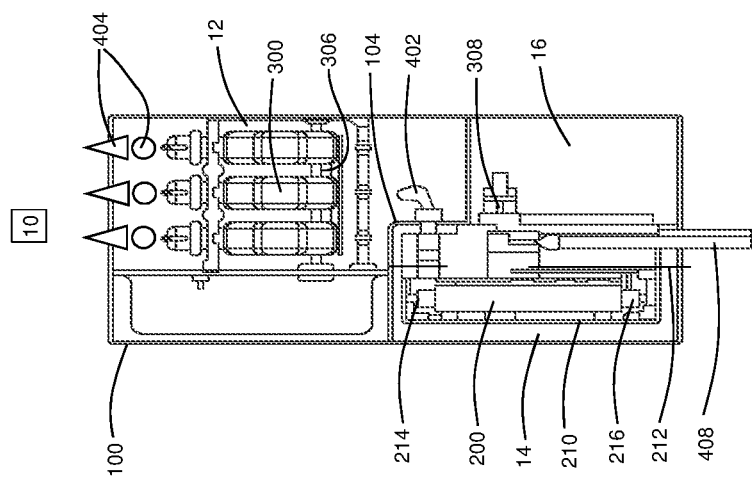
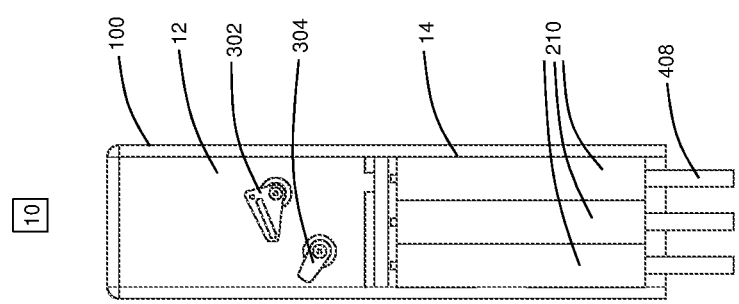

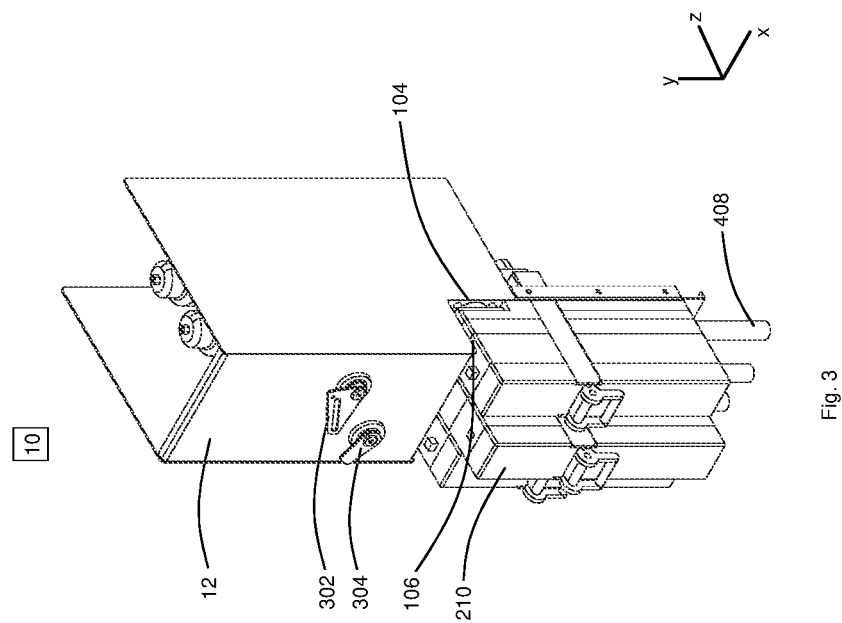

SWITCH-FUSE MODULE

TECHNICAL FIELD

Embodiments of the present disclosure relate to a switch-fuse module, in particular a switch-fuse module for use with insulating gases with global warming potential less than global warming potential of SF6, and to a ring main unit including the switch-fuse module.

BACKGROUND

In medium- or high-voltage equipment, the gas sulphur hexafluoride (SF6) plays a key role as an insulating and arc-quenching medium, particularly in a switchgear. In addition to its many advantages in terms of technical properties, SF6 has the disadvantage of having a very high global warming potential. It is a potent greenhouse gas. Therefore, recently, alternative insulating gases such as ketone gases have been investigated.

For medium- or high-voltage equipment, it is desired, from a customer point of view, that the equipment takes up as little floor space as possible or at least does not exceed the size of traditional units, thus enabling the customer to renew existing equipment without additional space requirements, preferably in combination with existing customer components, and from a manufacturer point of view, and that existing production lines can be used with as few changes as possible to produce as cost-effectively as possible. This is a challenge in case of alternative gases, since these are assumed to require larger distances for obtaining dielectric properties comparable to those of SF6.

Thus, there is a need for medium- or high-voltage equipment that addresses environmental concerns. There is also a need to provide medium- or high-voltage equipment with low floor space requirement, that can be manufactured and/or utilized in a cost-effective manner. Furthermore, there is also a need for medium- or high-voltage equipment that takes into account the distance requirements based on dielectric and thermal properties of the alternative gases.

Terms and Definitions

This application uses terms whose meaning is briefly explained here.

The term axial refers to a longitudinal axis of an element or unit. The term longitudinal refers to a direction in which the element has the greatest spatial extension and/or a symmetry axis. The term lateral refers to a direction perpendicular to the longitudinal axis, in which the object has the second largest extension and/or which is parallel to a horizontal direction when mounted in a regular mounting orientation. An axial direction refers to a direction parallel to the longitudinal axis of the element.

Value ranges defined as x1, or x2, etc. to y1, or y2, etc. mean that the values are within intervals such as x1 to y1, or x1 to y2, or x2 to y1, or x2 to y2, etc.

An x- and z-direction as shown in FIG. 3 may be perpendicular to each other and may define a horizontal or x-z plane. The y-direction may then be a vertical direction, perpendicular to the horizontal plane. A view of the switch-fuse module in a direction perpendicular to z-y plane may be a side view. Accordingly, a footprint may be in the horizontal plane. Similarly, a view of the switch-fuse module in a direction perpendicular to x-y plane may be a front or back view. Terms such as "vertical" and "horizontal" may refer to the respective directions when the switch-fuse module is mounted in a regular mounting orientation in which the module is ready for operation, especially with an operating panel oriented on a vertical front face of the switch-fuse module.

The terms "above" and "below" refer to positions that are different with respect to the y-axis. Therefore, an object A is positioned above (or below) an object B if the y coordinate of the centroid of object A has a higher (or lower) value than the y coordinate of the centroid of object B.

A height of an object may be understood as an object extension in the y direction, a depth may be understood as an object extension in the z direction, and a width may be understood as an object extension in the x direction.

In this document, "or" is understood as a non-exclusive disjunction. Accordingly, the link "A or B" expresses that at least one of the involved statements A, B is true.

Furthermore, the terms "a" or "the", such as in the expression "a fuse" or "the fuse", are used to refer to at least one fuse. The quantity "a" or "the" includes the quantity "at least one". If the term "at least one" is used explicitly, a subsequent use of "a" or "the" does not imply any deviation from the aforementioned principle according to which "a" or "the" is to be understood as "at least one".

The terms "substantially" or "basically" as used herein typically imply that there may be a certain deviation, e.g. up to 1%, up to 3% or up to 10%, from the characteristic denoted with "substantially".

SUMMARY

In view of the above, a switch-fuse module and a ring-main unit having a switch-fuse module according to the claims, are provided.

According to an aspect of the present disclosure, a switch-fuse module is provided. The switch-fuse module includes: a housing having therein a switch enclosure including an insulating gas and a cable compartment that is different and separate from the switch enclosure, at least one switch disconnector arranged within the switch enclosure, and at least one fuse canister with a vertically oriented longitudinal axis. The fuse canister i) is adapted to receive a fuse, and ii) is arranged within the cable compartment. The insulating gas has a global warming potential less than a global warming potential of SF6.

According to another aspect of the present disclosure, a ring main unit is provided. The ring main unit includes the switch-fuse module.

Some advantages relating to the switch-fuse module and the ring main unit are described as follows.

An advantage is that the configurations of functional units such as cable switching and circuit break for ring main units use environmentally friendly gases as dielectric medium.

An advantage is that criteria such as dielectric level, mechanical linkage, and requirements of a 12 kV and/or 24 kV ring main unit may be provided for SF6 free equipment.

An advantage is that the equipment production is possible using existing production lines with as few changes as possible to produce as cost-effectively as possible.

An advantage is that a horizontal footprint or horizontal dimensions, or dimensions perpendicular to an access door to the switch-fuse module of existing switchgear may be maintained within a prescribed limit. The equipment takes up as little floor space as possible or at least does not exceed the size of traditional units, thus enabling the customer to renew existing equipment without additional space requirements, preferably in combination with existing customer components.

An advantage is that distance requirements of gases used as alternatives to SF6, especially the requirements for distances between fuses, can be met.

An advantage is that a switch-fuse combination for eco-efficient gas insulating switchgear may be provided.

Further aspects, advantages and features of the present disclosure are apparent from the dependent claims, the description, and the accompanying drawings.

BRIEF DESCRIPTION OF THE DRAWINGS

So that the manner in which the above recited features of the present disclosure can be understood in detail, a more particular description of the present disclosure, briefly summarized above, may be had by reference to typical embodiments. The accompanying drawings relate to embodiments of the present disclosure and are described in the following:

FIG. 1 shows a schematic front view of a switch-fuse module according to embodiments described herein;

FIG. 2 shows a schematic side view of a switch-fuse module according to embodiments described herein; and FIG. 3 shows a perspective 3D view of the interior of a switch-fuse module inside the housing according to embodiments described herein.

DETAILED DESCRIPTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described.

The reference numbers of the figures are used merely for illustration. The aspects of the invention are not limited to any particular embodiment. Instead, any aspect or embodiment described herein can be combined with any other aspect or embodiment described herein unless specified otherwise.

FIGS. 1, 2, 3 show schematic views of a switch-fuse module according to embodiments of the present invention, wherein some additional typical parts like actuators, levers, motors, canister lids are omitted in the Figures for the sake of clarity. FIG. 1 shows a front view and FIG. 2 shows a side view of a switch-fuse module. FIG. 3 shows a perspective 3D view of the interior of a switch-fuse module inside the housing. Details explained with illustrative reference to FIGS. 1, 2, 3 shall not be understood as limited to the elements of FIGS. 1, 2, 3. Rather, those details may also be combined with further embodiments explained with illustrative reference to the other figures.

According to embodiments described herein, a switch-fuse module 10 may include: a housing having therein a switch enclosure 12 including an insulating gas and a cable compartment 14 that is different and separate from the switch enclosure 12, at least one switch disconnector 300 arranged within the switch enclosure 12, and at least one fuse canister 210 with a vertically oriented longitudinal axis 212. The fuse canister 210 i) is adapted to receive a fuse 200, and ii) is arranged within the cable compartment 14. The insulating gas has a global warming potential less than a global warming potential of SF6. Preferably, the switch fuse module may be designed as a switch-fuse combination module.

According to embodiments described herein, a ring main unit (not shown in the figures) may include the switch-fuse module 10.

A technical effect of the cable compartment 14 being different and separate from the switch enclosure 12 consists in that existing production lines for known standard components such as those normally used with SF6 can be used for manufacturing the present equipment. This is beneficial based on that the present equipment can be manufactured without additional costs in production, which may well secure competitive advantages.

Another technical effect of the cable compartment 14 being different and separate from the switch enclosure 12 consists in that pressure conditions and gas compositions in the respective compartments can be separately established and controlled. For example, the cable compartment 14 does not need to be gas-tight and may be filled with ambient air at ambient pressure, whereas switch enclosure 12 may be filled with, potentially pressurized, dielectric gas other than ambient air. This effect is beneficial based on improved control options of the respective compartments depending on the technical requirements, and/or increased flexibility in terms of tailoring to customer requirements.

Another technical effect of the cable compartment 14 being different and separate from the switch enclosure 12 consists in a modular concept resulting in improved maintenance and service options. If a problem occurs in one unit, only that unit needs to be dealt with in terms of repair or replacement and the other remains unaffected.

A technical effect of the fuse canister 210 having a vertically oriented longitudinal axis 212 consists in that the present equipment basically preserves the dimensions of standard equipment such as that normally used with SF6. This effect is beneficial for the user convenience, based on that users can easily integrate the present equipment into an existing standard environment, thus allowing to seamlessly exchange old modules for the present ones. This effect is also beneficial for the manufacturing process, based on that existing production lines for existing products or equipment such as those normally used with SF6 or other alternative gases can be used for manufacturing the present equipment, thus reducing production costs.

Another technical effect of the fuse canister 210 having a vertically oriented longitudinal axis 212 consists in keeping to a minimum the horizontal footprint, i.e. the horizontal extension of the switch-fuse module 10 corresponding to the projection of the switch-fuse module 10 on the horizontal x-z plane, while at same time fully maintaining the structural stability or steadiness of the equipment.

According to embodiments, the switch disconnector 300 and/or the switch enclosure 12 may be arranged above the cable compartment 14. According to embodiments, the switch enclosure 12 and the cable compartment 14 may be arranged adjacently, preferably spaced from each other at a first distance 106 and/or spaced apart from each other by an internal wall portion. Preferably, the first distance may be understood as the thickness of at least one wall separating the switch enclosure 12 from the cable compartment 14 or as a distance between a lateral side wall of a fuse canister 210 and a side wall of the switch enclosure 12 adjacent to the fuse canister 210. The first distance 106 may be at least 2 mm, 5 mm, or 10 mm, up to at most 20 mm, 40 mm, or 100 mm.

The technical effect of the switch enclosure 12 being arranged i) above the cable compartment 14 and/or ii) adjacently, and/or iii) spaced from each other at a first distance 106, consists in keeping to a minimum the horizontal footprint, i.e. the horizontal extension of the switch-fuse module 10 corresponding to the projection of the switch-fuse module 10 on the horizontal x-z plane, while at same time fully maintaining the structural stability or steadiness of the equipment. Furthermore, the distance between the units effects a good thermal cooling and/or dielectric insulation of the units against each other.

According to embodiments, the switch enclosure 12 may be separated from the cable compartment 14 by a step-like separating wall portion defining or forming a lower volume portion of the switch enclosure 12 and a horizontally adjacent upper volume portion of the cable compartment 14. According to embodiments, the step-like separating wall portion may have a vertical wall portion and/or a horizontal wall portion. The vertical wall portion and the horizontal wall portion may form the step-like separating wall portion.

According to embodiments, the step-like separating wall portion of the switch enclosure 12 may form a step-like or staircase-shaped indentation 104 in a lower region of the switch enclosure 12. The indentation may be part of the switch enclosure 12. The cable compartment 14 may be partially placed in the indentation. According to embodiments, the indentation of the switch enclosure 12 may be cuboid-shaped.

The technical effect of the switch enclosure 12 indentation is that despite the vertical arrangement of the fuse canister 210 and/or of the arrangement of the switch disconnector 300 unit above the cable compartment 14 unit, at least one electrical internal bushing 402 between the two units can be arranged laterally horizontally between the two units. This arrangement is space-saving and takes into account the component setup in the switch enclosure 12.

According to embodiments, the at least one fuse 200 may include three fuses 200. According to embodiments, the at least one internal bushing 402 may include three internal bushings 402. According to embodiments, the fuse 200 may be electrically connected at a first end 214 to the switch disconnector 300 via the internal bushing 402 passing from the switch enclosure 12 into the cable compartment 14. The first fuse end 214 and a canister area covering the first fuse end 214 are both addressed by the reference sign 214. Additionally, or alternatively, the fuse 200 may be electrically connected at a second end 216 to one of a cable connection 408 for connecting to an external cable. The second fuse end 216 and a canister area covering the second fuse end 216 are both addressed by the reference sign 216. The external cable may form a connection to an external network or may be part of the network. According to embodiments, the internal bushing 402 may travers the vertical wall portion of the step-like separating wall portion. According to embodiments, the fuse 200 may be configured to be accessible from the front of the switch-fuse module 10.

According to embodiments, each of the three fuses 200 may be connected to one of three current phases. Additionally, or alternatively, the three fuses 200 may be arranged substantially parallel to each other. Additionally, or alternatively, the three fuses 200 may be arranged substantially at the same vertical height, preferably with no vertical offset to each other. According to embodiments, the switch-fuse module 10 may be an AC switch-fuse module 10.

According to embodiments, each of the three fuses 200 may have a longitudinal axis, that preferably may coincide with the respective fuse axis 212. The axes may be arranged basically parallel to each other.

According to embodiments, the longitudinal axis of the middle fuse 200 may be laterally offset with respect to the axes of the peripheral fuses 200. Additionally, or alternatively, the longitudinal axis of the middle fuse 200 may be arranged outside of a plane defined by the peripheral fuses 200.

The technical effect of the longitudinal axis of the middle fuse 200 being arranged outside of a plane defined by the peripheral fuses 200 is that the distance between fuses 200 is increased, resulting in improved dielectric insulation between the fuses 200 and/or heat dissipation.

According to embodiments, the at least one fuse canister 210 may include three fuse canisters 210, preferably each fuse canister 210 receiving one fuse 200. According to embodiments, the fuse canister 210 may be formed as an elongated cuboid. Alternatively, the fuse canister 210 may be cylindrically formed. According to embodiments, the fuse canister 210 may be arranged at least partially within the upper volume portion of the cable compartment 14.

According to embodiments, the cable connection 408 may be placed at a vertically higher position than the second end 216 of the fuse 200. Alternatively, the cable connection 408 may be placed at a vertically lower position than the first end 214 of the fuse 200. According to embodiments, the cable connection 408 may have a vertical height overlapping with the fuse 200. According to embodiments, the cable compartment 14 may include current and voltage sensors.

According to embodiments, the insulating gas may have a dielectric strength lower than the dielectric strength of SF6.

According to embodiments, the switch-fuse module 10 may further include a first earthing switch 308 for earthing the second end 216 of the fuse 200, and at least one earthing shaft for operating the first earthing switch 308 and the second earthing switch (and possibly a third earthing switch). The first earthing switch 308 may be arranged in the cable compartment 14.

A plurality of first earthing switches 308 may be arranged, one for each fuse 200. The first earthing switch 308 may be arranged downstream of fuse 200 within the cable compartment 14 (which may thus also be referred to as the fuse compartment). The second earthing switch (not shown; arranged at or below the switch disconnector 300) may be arranged upstream of fuse 200 within the switch compartment 12. In this document, upstream and downstream are related to the direction from switch disconnector 300 to fuse 200.

Further, a thin metal cylinder may be molded inside a wall of the fuse canister, wherein the wall is earthed. The fuse canister 120 may have two connection points, wherein each connection point is connected to a respective end 214, 216 of the fuse 200. The first ends 214 of fuse canisters 210 are isolated from the fuse ends, and are interconnected to each other by means of a canister earthing cable 218 which is configured as an earthing wire for shielding the canister.

According to embodiments, the switch-fuse module 10 may be configured for a rated voltage in a range from 1 kV to 52 kV.

According to embodiments, the switch disconnector 300 may be configured as a load-break switch (LBS). Especially, the switch disconnector 300 may be configured as an integrated two-position load break switch plus a separate, second earthing switch including an earthing shaft 306. The switch disconnector 300 may have two shafts: i) one shaft is operable by a handle 302 and is used to open or close the main line, and ii) the other shaft 306 is operable by a handle 304 and is used to open or earth the main line.

According to embodiments, the switch-fuse module may include a at least one connector bushing at a top side or a lateral side of the switch compartment connecting the switch disconnector to electrical components external to the switch-fuse module such as a network. The connector bushing at the top side of the switch compartment may additionally be connected to an external line, or may be connected, via a busbar, to a neighboring panel. The at least one connector bushing may include three connector bushings 404.

According to embodiments, the switch-fuse module 10 may include a second earthing switch that is arranged in the switch enclosure 12 between the internal bushing 402 and the switch disconnector 300.

According to embodiments, the at least one canister 210 may include three canisters 210. Each canister 210 may receive one fuse 200.

According to embodiments, the switch enclosure 12 and the cable compartment 14 may be gas-tight with respect to each other. That means that the switch enclosure 12 and cable compartment 14 may be isolated from each other in a gas-tight manner. This effects the possibility that pressure conditions in the switch enclosure 12 can be autonomously and/or independently from each other established and controlled. This effect is beneficial based on improved control options of the switch enclosure 12 depending on the technical requirements, and/or increased flexibility in terms of tailoring to customer requirements.

According to embodiments, the switch compartment 12 or cable compartment 14 may be configured as a pressurised tank.

According to embodiments, the switch-fuse module 10 may include a pressure relief compartment 16 arranged below the switch compartment 12 and/or laterally to the cable compartment 14. The pressure relief compartment 16 may be adapted to provide pressure compensation with respect to the switch-fuse module 10 on the one hand and/or the switch compartment 12 on the other. The term compensation means that the pressure relief compartment 16 may include a rupture disk on the lowest horizontal wall of the switch compartment 12 which breaks under fault arc (high pressure) and opens the hot gas toward the floor, in order to prevent the injury to the operator.

According to embodiments, the switch-fuse module 10 may be configured for a rated voltage in a range from 1 kV to 52 kV.

Some embodiments relating to the geometry and dimensions of the switch-fuse module 10 are described as follows.

The switch-fuse module 10 and/or ring main unit including the switch-fuse module 10 may have a height of more than 1000 mm and/or less than 1750 mm, or alternatively more than 1000 mm and/or less than 2000 mm. For example, the switch-fuse module 10 may have a height of less than 1750 mm.

The switch-fuse module 10 and/or ring main unit may have a depth of more than 500 mm and/or less than 850 mm, or alternatively more than 500 mm and/or less than 1000 mm. For example, the switch-fuse module 10 may have a depth of less than 850 mm.

The switch-fuse module 10 and/or ring main unit may have a width of more than 300 mm and/or less than 800 mm, or alternatively more than 300 mm and/or less than 1000 mm. For example, the switch-fuse module 10 may have a width of less than 800 mm.

It may be understood that a larger switch-fuse module 10 and/or ring main unit dimensions may be suitable for a higher rated voltage. For example, a switch-fuse module 10 and/or a ring main unit may be for a rated voltage in a range from 1 kV or 12 kV to 24 kV, with a height of more than 1000 mm and/or less than 1750 mm, depth of more than 500 mm and/or less than 850, and/or width of more than 300 mm and/or less than 800 mm, while a switch-fuse module 10 and/or a ring main unit may be for a rated voltage in a range from 36 kV to 42 kV, with a height of more than 1000 mm and/or less than 2000 mm, depth of more than 500 mm and/or less than 1000, and/or width of more than 400 mm and/or less than 1000 mm.

Some embodiments relating to the fuse 200 and switch-disconnector are described as follows.

In some embodiments, up to five switches, e.g. disconnector-switches, and/or panels, e.g. general panels, may be included in the switch enclosure 12.

A puffer switching device or vacuum interrupter may be utilised as the switch-disconnector. Alternatively, a puffer switching device may be utilised in addition to the switch-disconnector. Alternatively, a vacuum interrupter may be utilised. The puffer switching device may include a fixed tulip contact. The fixed tulip contact may be connected to the busbar. The puffer switching device may include a linearly sliding electrode, a blowing compression chamber, and/or blowing ports. The puffer switching device may include a rotating shaft to disconnect the line, which may be a load break shaft for example. The switch enclosure 12 may cover the load break shaft of the panel.

Some embodiments relating to the insulating gases are described as follows.

The switch enclosure 12 may be configured as a pressurized tank containing each an insulating gas with dielectric strength lower than dielectric strength of SF6. The pressurized tank may be configured to be filled, for example during installation and/or commissioning, to an absolute pressure in a range from 1.0 bar to 2.0 bar, preferably in a range from 1.3 bar to 1.4 bar.

Global warming potential may be understood to be assessed over an interval of 100 years, relative to CO2 gas. SF6 may be considered to have a global warming potential of 22,200 times that of CO2 over a 100-year period. The insulating gases having dielectric strength lower than dielectric strength of SF6 include at least one gas component selected from the group consisting of: CO2, O2, N2, H2, air, N2O, a hydrocarbon, in particular CH4, a perfluorinated or partially hydrogenated organofluorine compound, and mixtures thereof. In further embodiments, the insulating gases include a background gas, in particular selected from the group consisting of: CO2, O2, N2, H2, air, in a mixture with an organofluorine compound selected from the group consisting of: fluoroether, oxirane, fluoramine, fluoroketone, fluoroolefin, fluoronitrile, and mixtures and/or decomposition products thereof. For example, the insulating gases may include dry air or technical air. Each of the insulating gases may be a dielectric insulating medium. The insulating gases may in particular include an organofluorine compound selected from the group consisting of: a fluoroether, an oxirane, a fluoramine, a fluoroketone, a fluoroolefin, a fluoronitrile, and mixtures and/or decomposition products thereof. In particular, the insulating gases may include as a hydrocarbon at least CH4, a perfluorinated and/or partially hydrogenated organofluorine compound, and mixtures thereof. The organofluorine compound is preferably selected from the group consisting of: a fluorocarbon, a fluoroether, a fluoroamine, a fluoronitrile, and a fluoroketone; and preferably is a fluoroketone and/or a fluoroether, more preferably a perfluoroketone and/or a hydrofluoroether, more preferably a perfluoroketone having from 4 to 12 carbon atoms and even more preferably a perfluoroketone having 4, 5 or 6 carbon atoms. The insulating gases preferably includes the fluoroketone mixed with air or an air component such as N2, O2, and/or CO2.

In specific cases, the fluoronitrile mentioned above is a perfluoronitrile, in particular a perfluoronitrile containing two carbon atoms, and/or three carbon atoms, and/or four carbon atoms. More particularly, the fluoronitrile can be a perfluoroalkylnitrile, specifically perfluoroacetonitrile, perfluoropropionitrile (C2F5CN) and/or perfluorobutyronitrile (C3F7CN). Most particularly, the fluoronitrile can be perfluoroisobutyronitrile (according to formula (CF3)2CFCN) and/or perfluoro-2-methoxypropanenitrile (according to formula CF3CF(OCF3)CN). Of these, perfluoroisobutyronitrile is particularly preferred due to its low toxicity.

As an example, the switch-fuse module 10 can operate with air, dry air, and/or a gas mixture including air for a rated voltage in a range from 1 kV to 52 kV, for example 12 kV or a 12 kV rated switchgear. In another example, the switch-fuse module 10 can operate with a gas mixture including a C5 perfluoroketone and/or air, for a rated voltage in a range from 1 kV to 52 kV, for example 24 kV or a 24 kV rated switchgear.

Some embodiments relating to the first earthing switch 308 and second earthing switch are described hereinafter.

The first earthing switch 308 may be horizontally mounted in the cable compartment 14. The second earthing switch may be mounted below the switch disconnector 300. The second earthing switch may be configured to earth a first fuse end 214. The first earthing switch may be configured for earthing the second fuse end 216. The first and/or second fuse end 214, 216 may be an electrical conductive side of the fuse 200.

The first earthing switch 308 and the second earthing switch may be configured to be operated substantially simultaneously and/or jointly connected to a common actuating mechanism. Especially, both upstream and downstream of the fuse 200 may be simultaneously grounded. In this document, upstream and downstream are related to the direction of the energy flow.

Some embodiments relating to elements of the switch-fuse module 10 are described as follows.

The switch-fuse module 10 may be configured for a rated voltage in a range from 1 kV to 52 kV, or from 1 kV to 42 kV, or from 10 kV to 42 kV, or from 12 kV to 42 kV, or for 12 kV and 24 kV and/or 36 kV and/or 40.5 kV. In one particular example, it may be understood that a 24 kV rated unit may fulfil dielectric withstand of at least 125 kV lightning impulse.

The first distance between the switch enclosure 12 and the canister 210 or canister end 214 may provide dielectric capability for a rated voltage, for example for a rated voltage in a range from 1 kV to 52 kV.

The switch-fuse module 10 may include at least one busbar. In an example, the busbar may be a metallic strip or bar, and/or may be housed inside a switchgear, a panel board, and/or busway enclosures, and in some examples, suitable for local and/or high current power distribution and/or suitable for connecting high voltage equipment. The busbar may be arranged substantially parallel to a vertical plane that includes the switch-disconnector, and/or in a horizontal direction or alternatively in a vertical direction, and/or perpendicular to a central axis 212 of the fuse 200.

The busbar may be mounted above the fuse 200 and/or the switch-disconnector. The busbar may be a long connection (for example, a busbar adapted for interconnecting a plurality of panels or switchboards such as the switch-fuse module), or a short connection (for example, a busbar section interconnecting the switch-disconnector with a further bushing, wherein said further bushing may be connected to a line or to a further busbar section).

A space between the fuse 200 or the electrical linkage of the fuse 200, and the enclosure walls provides dielectric capability for a rated voltage in a range from 1 kV to 52 kV. In an exemplarily embodiment, at least one busbar may be arranged at a second distance above the switch-disconnector, wherein the second distance may be at least a distance dielectrically suitable for a rated voltage in a range from 1 kV to 52 kV in the presence of the insulating gases at operating conditions.

The switch-fuse module 10 may be adapted to protect a transformer that may be part of an electrical network.

The switch-fuse 200 module 10 may be interconnected, e.g., via a busbar, to further panels and/or switchboards interconnected by the busbar, thereby constituting a switchgear including the panels and/or switchboards including the switch-fuse module 10. The switch fuse module may be an outermost panel of a switchgear. Where the switch-fuse module 10 is the outermost panel of a switchgear, extensions of top and side bushings may be mounted. A positioning of components such as the fuse 200, the electrical linkage, the busbar and/or the switch-disconnector may provide the needed dielectric strength. The external surface of conductive materials may be configured to provide the needed dielectric strength.

According to aspects described herein, a ring main unit may be provided. The ring main unit may have a switch-fuse module 10 according to aspects and/or embodiments described herein.

This written description uses examples to disclose the disclosure, including the best mode, and also to enable any person skilled in the art to practice the described subject-matter, including making and using any apparatus or system. Embodiments described herein provide an improved switch-fuse module and ring main unit, wherein environmentally friendly gases are used as dielectric medium, the equipment can economically be manufactured, and increased flexibility in terms of tailoring to customer requirements is provided. While various specific embodiments have been disclosed in the foregoing, mutually non-exclusive features of the embodiments described above may be combined with each other. The patentable scope is defined by the claims, and other examples are intended to be within the scope of the claims if they have structural elements that do not differ from the literal language of the claims, or if they include equivalent structural elements with insubstantial differences from the literal language of the claims.

The invention claimed is:

1. A switch-fuse module comprising:
a housing having therein a switch enclosure comprising an insulating gas and a cable compartment that is different and separate from the switch enclosure;
at least one switch disconnector arranged within the switch enclosure; and
at least one fuse canister with a vertically oriented longitudinal axis;
wherein the fuse canister is adapted to receive a fuse and is arranged within the cable compartment, and
the insulating gas has a global warming potential less than a global warming potential of SF6.

2. The switch-fuse module according to claim 1, wherein the switch disconnector and the switch enclosure is arranged above the cable compartment; and the switch enclosure and the cable compartment are arranged adjacently.

3. The switch-fuse module according to claim 1, wherein the switch enclosure is separated from the cable compartment by a step-shaped separating wall portion defining a lower volume portion of the switch enclosure and a horizontally adjacent upper volume portion of the cable compartment.

4. The switch-fuse module according to claim 3, wherein the step-shaped separating wall portion of the switch enclosure forms a step-shaped or staircase-shaped indentation in a lower region of the switch enclosure, the cable compartment being partially placed in the step-shaped or staircase-shaped indentation.

5. The switch-fuse module according to claim 1, wherein the fuse is electrically connected at a first end to the switch disconnector via an internal bushing passing from the switch enclosure into the cable compartment, and the fuse is electrically connected at a second end to one of a cable connection for connecting to an external cable.

6. The switch-fuse module according to claim 5, further comprising
the cable connection is placed at a vertically higher position than the second end of the fuse, or at a vertically lower position than the first end of the fuse; and
the cable connection has a vertical height overlapping with the fuse.

7. The switch-fuse module according to claim 5, wherein the switch enclosure is separated from the cable compartment by a step-shaped separating wall portion, the step-shaped separating wall portion having a vertical wall portion;
wherein the internal bushing traverses the vertical wall portion of the step-shaped separating wall portion.

8. The switch-fuse module according to claim 1, wherein the fuse is configured to be accessible from a front of the switch-fuse module.

9. The switch-fuse module according to claim 1, wherein the at least one fuse canister comprises three fuse canisters, each fuse canister receiving one fuse; and
wherein each fuse of the three fuse canisters is connected to one of three current phases.

10. The switch-fuse module according to claim 1, wherein the switch disconnector is configured as a load-break switch.

11. The switch-fuse module according to claim 1, wherein the insulating gas has a dielectric strength lower than a dielectric strength of SF6.

12. The switch-fuse module according to claim 1, comprising a first earthing switch for earthing a second end of the fuse, a second earthing switch for earthing a first end of the fuse, and at least one earthing shaft for operating the first earthing switch and the second earthing switch.

13. The switch-fuse module according to claim 1, wherein the switch enclosure and the cable compartment are spaced from each other at a first distance or separated from each other by an internal wall portion.

14. The switch-fuse module according to claim 1, wherein the at least one fuse canister comprises three fuse canisters, each fuse canister being adapted to receive one fuse; and
wherein the fuses of the three fuse canisters are arranged substantially parallel to each other and are all arranged substantially at one vertical height, with no vertical offset to each other.

15. The switch-fuse module according to claim 1, wherein the at least one fuse canister comprises a middle fuse canister and two peripheral fuse canisters, each fuse caniser being adapted to receive one fuse; and
wherein a longitudinal axis of the fuse of the middle fuse canister is laterally offset with respect to a longitudinal axis of the fuse of each peripheral fuse canister, or is arranged outside of a plane defined by the fuses of the peripheral fuse canisters.

16. The switch-fuse module according to claim 1, wherein the switch disconnector is configured as a puffer switching device or vacuum interrupter.

17. The switch-fuse module according to claim 1, wherein the cable compartment includes current and voltage sensors.

18. The switch-fuse module according to claim 1, wherein the switch-fuse module is configured for a rated voltage in a range from 1 kV to 52 kV.

19. The switch-fuse module according to claim 1, wherein the fuse canister is arranged at least partially within an upper volume portion of the cable compartment.

20. The switch-fuse module according to claim 1, wherein the switch enclosure is isolated from the cable compartment such that the switch enclosure and the cable compartment are gas-tight with respect to each other.

21. The switch-fuse module according to claim 1, wherein the cable compartment is different and separate from the switch enclosure such that a pressure condition in the cable compartment is separately controlled from a pressure condition in the switch enclosure.

22. A ring main unit comprising a switch fuse module including:
a housing having therein a switch enclosure comprising an insulating gas and a cable compartment that is different and separate from the switch enclosure;
at least one switch disconnector arranged within the switch enclosure; and
at least one fuse canister with a vertically oriented longitudinal axis;
wherein the fuse canister is adapted to receive a fuse and is arranged within the cable compartment, and
the insulating gas has a global warming potential less than a global warming potential of SF6.

* * * * *